3,380,980
PREPARATION OF METHYL METHACRYLATE POLYMER SIRUPS

William Harold Calkins, Wilmington, Del., Edward Noonan Squire, Glen Mills, Pa., and Mandell Stanley Ziegler, Massapequa, N.Y., assignors to E. I. du Pont de Nemours and Company, Wilmington, Del., a corporation of Delaware
No Drawing. Continuation-in-part of application Ser. No. 249,327, Jan. 4, 1963, which is a continuation-in-part of application Ser. No. 694,513, Nov. 5, 1957. This application Jan. 6, 1965, Ser. No. 423,849
5 Claims. (Cl. 260—89.5)

ABSTRACT OF THE DISCLOSURE

Shelf-stable polymer-in-monomer sirups, for use in producing laminate articles, which possess a flowable viscosity and a minimum exotherm of polymerization and which contain at least 20% by weight of polymeric methyl methacrylate in monomeric methyl methacrylate, less than 20 parts per million of a polymerization initiator, and a small amount of stabilizing inhibitor are provided by a process which includes the steps of preparing a solution containing methyl methacrylate, a chain transfer agent and an amount of polymerization initiator sufficient to initiate polymerization but insufficient to leave more than 20 p.p.m. of initiator after polymerization, heating the solution between 50 and 150° C. and quenching the solution by adding a polymerization inhibitor.

---

This application is a continuation-in-part of application Ser. No. 249,327, filed Jan. 4, 1963, and now abandoned, which application is in turn a continuation-in-part of application Ser. No. 694,513, filed Nov. 5, 1957, and now abandoned.

This invention relates to new compositions of matter containing partially polymerized methacrylates suitable as laminating compositions and more particularly to monomer-polymer sirups of methacrylic ester compositions, processes for their preparation and use.

Prior to the present invention no fully acrylate or methacrylate monomer-polymer sirup has been available to the fabricator that was stable, had a useful viscosity, and sufficiently high concentration of polymer such that it could be molded at a high rate to give, in the presence or absence of pigments, fillers or the like, markedly improved laminate articles having superior weathering, stiffness and craze-resistant properties. The invention provides such sirups and methods of using them.

Objects of the present invention are to provide monomer-polymer sirups that are stable to polymerization on storage; a process for producing these sirups; and processes for their polymerization and laminate products produced therefrom. Another object is to provide monomer-polymer sirups with relatively high concentrations of polymer of low inherent viscosity. A further object is to provide monomer-polymer sirups of acrylic and methacrylic esters of relatively low exothermicity and shrinkage during final molding and polymerization. Another object is to provide stable and flowable sirups of monomer and polymer-containing methacrylic acid esters and a process for molding, polymerizing and cross-linking the sirups in the presence of fibers, to weather-resistant laminate articles. Other objects and advantages of the invention will hereinafter appear.

The invention relates to the preparation of polymer-in-monomer sirups containing at least 20% by weight of polymeric methyl methacrylate in monomeric methyl methacrylate that can be mixed with or absorbed by fibrous materials and thereafter molded, polymerized and cured to give weather-resistant articles. The sirups of the invention are shelf-stable, have a flowable viscosity to permit easy use, a ratio of polymer to monomer to provide a minimum of shrinkage, and a minimum exotherm of polymerization, consistent with good physical properties of the product laminates. Moreover, the sirup can be polymerized to a product having superior weatherability. Furthermore, the sirups of the invention contain cross-linking agents which produce fabricated plastic products on final polymerization that possess superior physical properties and surface qualities, and that are capable of being formed at the rapid rates demanded by modern industry.

Monomer-polymer sirups of the invention are made from any suitable polymerizable organic compound containing monovinyl unsaturation, such as vinyl acetate, styrene, alkyl acrylates, alkyl methacrylates, etc., and more especially from the methacrylic esters such as methyl methacrylate. Methyl methacrylate may be used with other polymerizable vinyl compounds such as the ethyl acrylates and the like, in which the methyl methacrylate constitutes at least 50% by weight of the resin content of the composition. Such comonomers can be chosen to modify properties of the sirup and product laminates. Care should be exercised in choice of comonomer so as not to adversely affect laminate weatherability, heat resistance, stability, etc.

Effectiveness for subsequent molding is obtained if a sirup has a relatively low exothermicity and a low shrinkage. A sirup with low exothermicity is one that on polymerization of its monomer content gives a minimum heat of reaction. Such a sirup is produced by increasing the polymer to monomer ratio, for the higher the polymer content the lower will be the exothermicity of the polymerization of the sirup.

The sirups of the invention are distinguished from monomer-polymer solutions of the art in the following respects:

(a) The excellent storage stability of the sirup arising from its extremely low residual initiator content and the presence of traces of polymerization inhibitors;

(b) The inherent viscosity (a measure of molecular weight) of the polymer portion of the sirup which is selected high enough to insure good physical properties of the product laminates but low enough to allow use of relatively high polymer content with resultant low shrinkage and exothermicity, thereby enabling and facilitating fabrication into reinforced plastic structures, and preferably (c) The presence of 0.1 to 20.0% of a divinyl compound (such as ethylene dimethacrylate) which improves the physical properties of the product laminates while at the same time increasing the speed of cure and thereby improving the ease and economics of fabrication.

Prior art monomer-polymer sirups have been made by partially polymerizing methyl methacrylate without the use of transfer agents or due regard for the proper type and quantity of initiator or siruping time and temperature thus leading to sirups which were not storable or shippable, as is usually required in the laminating industry. Alternatively, they have been made by dissolving commercially available, fully polymerized acrylic polymers in methyl methacrylate monomer to produce sirups of suitable viscosity. These commercial polymers are expensive and of inherent viscosity (0.44–2.0) such that only a limited concentration of polymer could be used, thereby resulting in sirups of relatively high shrinkage and exothermicity.

The sirups of the present invention having bulk viscosities in the range of 0.5 to 50 poises constitute balanced formulae containing polymers of low inherent viscosity, 0.25 to 1.0, and preferably 0.30 to 0.55, and with correspondingly high polymer content and suitable quantities of cross-linking agents to provide optimum physical properties and desirable curing characteristics. The inherent viscosity is determined at 20° C. in chloroform solution at a concentration of 0.50 gram/100 ml. according to the method described in F. W. Billmeyer, Textbook of Polymer Chemistry, Interscience Publishing Inc. (1957), p. 128.

The sirup of the invention may be prepared by any suitable process such, for example, as by partially polymerizing monomer (i.e. methyl methacrylate) by a process that will produce the prescribed polymer or by dissolving the described amount of polymer having the prescribed inherent viscosity in the monomer. Forming the polymer, in situ, is the preferred method. By such a method a suitable chain transfer agent is present during polymerization of the methyl methacrylate to limit the inherent viscosity in accord with prior art processes, such as is described in U.S. Patent 2,462,895, issued Mar. 1, 1949, to Joseph L. Quinn. The reaction should be catalyzed with only sufficient polymerization initiator to produce the desired amount of polymer; we have found that even small amounts of residual initiator in the sirup makes it unstable.

The prepared sirup, for use in molding and in the preparation of laminate articles containing fibers, fillers and the like, has a viscosity in poises, at 25° C., of 50 or less and preferably between 2 and 15. The preparation of such a sirup necessarily involves the use of the aforesaid low viscosity polymer either formed in situ or by solution, dissolved in sufficient amounts of monomer, as described aforesaid, the sirup giving on polymerization a composition having not only a low shrinkage and exothermicity acceptable to the fabricator but also giving a laminate article having superior properties.

The sirup is preferably made by heating a small amount of a polymerization initiator in solution in an inhibitor-free acrylic or methacrylic ester in the presence of a chain transfer agent at suitable pressure and temperature until the solution has reached a predetermined viscosity, thereafter the hot solution is quenched by the addition of cold monomer containing a polymerization inhibitor. More specifically, a sirup having a viscosity between about 1 and 50 poises at 25° C. and preferably between 2 and 15 poises at that temperature, can be produced from methyl methacrylate by heating monomeric methyl methacrylate in a stirred jacketed kettle under reflux, at atmospheric pressure in the presence of a predetermined small amount of initiator and from 0.05 to 1.0 mole percent, and preferably from 0.1 to 0.4 mole percent of a chain transfer agent. This solution is heated at a temperature between 50 and 150° C. and preferably 95° C. to 105° C., until the predetermined viscosity of the solution has been attained and until the initiator content has been reduced to below 20 p.p.m. The polymerization is then stopped by cooling in any suitable manner, as, for example and preferably, by the addition of from 1 to 10 parts by weight of cold methyl methacrylate containing sufficient hydroquinone to inhibit completely the polymerization of the methyl methacrylate.

The sirup, as prepared, has a long storage life because the initiator used is substantially all consumed to leave no more than about 20 p.p.m. of initiator after polymerization and this small amount is not effective as an initiator for the reaction because of the presence of the polymerization inhibitor.

The stable sirup prepared as described is an article of commerce that is sold to fabricators for use in their molding operations. The fabricator mixes the stable sirup with a suitable polymerization initiator, and preferably a filler, and subjects the resulting mixture (or sirup if no filler is added) to a molding operation in which the sirup is converted to a solid shape simultaneously with the polymerization of its monomer content.

The sirup of the invention reduces difficulties during shaping, due to comparatively low monomer content of the sirup. This results in low exothermicity during shaping and polymerization, in contrast with prior art sirups. The reduced exothermicity makes it possible to process parts rapidly and without blemishes, such as bubbles, flow lines, etc.

Another feature of the invention relates to the presence of the cross-linking agent. This agent improves the fabricability, physical properties, and weathering of the molded product, particularly when fibrous reinforcement is present.

The examples which follow describe preferred embodiments of the invention for making the sirup in which parts are by weight unless otherwise noted.

Example 1: A stirred, water-jacketed kettle provided with a reflux condenser was charged with 116 parts of inhibitor-free, monomeric methyl methacrylate and about 0.73 part of lauryl mercaptan. The resulting solution was heated to 80° C.±1° C. and then 0.0363 part of alpha,-alpha'-azobisisobutyronitrile dissolved in 5.0 parts of methyl methacrylate added. The jacket temperature was adjusted to 100° C.±1° C. and the kettle contents were allowed to reach reflux temperature, ca. 103° C. Samples were taken periodically from the reaction mixture and measured for viscosity. When the viscosity reached about 20 poises (on a sample cooled to 25° C.), the reaction was quenched by the addition of a 25° C. solution containing 0.00328 part of hydroquinone dissolved in 10.0 parts of methyl methacrylate. This point was reached in about 40 minutes after addition of the initiator.

The resulting sirup contained no detectable initiator, had a viscosity of about 20 poises at 25° C., had a polymer content of about 35%, an inherent viscosity of about .32, a molecular weight of about 50,000, and a good shelf stability, i.e., substantially no color change or viscosity change after 48 days. Shelf stability was measured at room temperature (about 72° F.) and at atmospheric pressure.

The process of Example 1 was substantially duplicated for the preparation of the following sirups of the same inhibitor content (25 p.p.m) (see table), all of which had excellent stability and shelf lives.

| Example | Initiator Kind | Initiator Amount (p.p.m.) | Chain-Trans. Agent Kind | Chain-Trans. Agent Amount (Percent) | Cycle, Min. at °C. | Inherent Visc. In Chloroform (.5 g./100 cc.) | Conver., Percent | Visc. at 25° C. | Storage Stability |
|---|---|---|---|---|---|---|---|---|---|
| 2 | (3) | 242 | (a) | .1 | 20 at 100 | 0.88 | 16.3 | 3.9 | Good. |
| 3 | (3) | 200 | (b) | .04 | 47 at 100 | 0.51 | | | Do. |
| 4 | (2) | 300 | (a) | .6 | 22 at 100 | 0.32 | 29.4 | 2.8 | Fair. |
| 5 | (2) | 500 | (a) | .6 | 27 at 100 | 0.32 | 33.4 | 8.4 | Do. |
| 6 | (2) | 300 | (a) | .6 | 50 at 100 | 0.32 | 38.3 | 13.5 | Good. |
| 7 | (1) | 1,000 | (a) | .1 | 13 at 100 | 0.60 | 28.2 | 30.2 | Poor. |
| 8 | (2) | 132 | (a) | .1 | 27 at 100 | 0.91 | 18.4 | 5.0 | Good. |
| 9 | (2) | 300 | (a) | .45 | 45 at 100 | 0.39 | 32.0 | 12.0 | Do. |

(1) Methyl ester of (2).  (2) Alpha, alpha'-azodiisobutyronitrile.  (3) Benzoyl peroxide.  (a) Lauryl mercaptan.  (b) Thio phenol.

Any suitable free-radical polymerization initiator may be used such as a peroxygen initiator, e.g., benzoyl peroxide, diethyl peroxide, diisobutyl peroxide; the azo initiators of the Hunt Patent U.S. 2,471,959, issued May 31, 1949, and the like. To produce a sirup only part of the methyl methacrylate is polymerized. The initiators present in the sirup after polymerization will, even at or below room temperature, and at a slow rate, continue polymerization. Sirup that contains initiator is potentially viscosity unstable. No more than small amounts of the initiator should be used, therefore, to insure that, when quenched, there is insufficient initiator remaining to cause undesirable polymerization.

Two factors govern the choice of conditions for a practical polymerization cycle. The conditions must be such that the polymerization rate is fast enough to be economically attractive, and secondly, the conditions must be such that the initiator is almost completely reacted. The polymerization rate can be calculated from the initiator concentration and temperature by equations well known in the chemical literature (see P. J. Flory, Principles of Polymer Chemistry, Cornell University Press (1953), p. 114). The approximate amount of initiator which can be added to the polymerization system and still not have too much remaining after siruping can be calculated in accordance with the formula $X=10^{-3} \cdot 2^{Pt/H}$, where X is the weight percent of initiator added prior to polymerization, H is the half-life of the initiator, and Pt is the polymerization time. (Any acceptable method for measuring the half-life of the initiator can be used, such as that described in the chemical literature, or that of Arthur W. Barry et al. application S.N. 614,824, filed Oct. 9, 1956, now abandoned.)

A chain transfer agent to the extent of from 0.05 to 1.0 mole percent is used to control polymerization and give a polymer having the prescribed inherent viscosity. A sirup containing such polymers can be quenched quickly to stop the polymerization at the desired amount. Any suitable chain transfer agent may be used such, for example, as thiophenol, lauryl mercaptan, or other alkyl or aryl mercaptans.

The quenching liquid used is a monomer of the ester being polymerized in which a stabilizing amount of suitable inhibitor for vinyl polymerization has been dissolved to the extent of preferably 10 to 100 parts per million parts of the sirup. Examples of such inhibitors are hydroquinone, the catechols, the pyrocatechols and other known inhibitors that are soluble in the monomer. The liquid solution containing .001 to 1% by weight of inhibitors at a temperature between 0 and 30° C. is added to the polymerizing sirup. This amount of inhibitor in cold monomer is sufficient in combination with cooling water in the jacket of the polymerization kettle to stop polymerization of the low molecular weight acrylic sirups, by reducing the temperature of the kettle contents to about 60° C. or lower.

The viscosity of the sirup can be measured by any standard method such as a Gardner tube, Brookfield viscosimeter or the like. In the specification and claims the viscosity given was measured by comparison with standard viscosity samples in Gardner viscosity tubes.

The cross-linking agent is added to the sirup in amounts up to 20% by weight after the quenching is completed. Any suitable polyunsaturated, cross-linking agent may be used, such, for example, as ethylene dimethacrylate, propylene dimethacrylate, polyethylene glycol dimethacrylate, divinyl benzene, triallyl cyanurate, and diallyl phthalate.

The sirups of the invention are marketed as such for a multiplicity of uses in which suitable polymerization initiators are added to polymerize the monomer contained in the sirup, the final polymerization being conducted by techniques similar to those presently used in polyester laminating and potting technology. The sirups may be mixed with inert additives such as glass fibers, powdered metals, pigments, natural and synthetic fibers, and other toughening, filling, coloring and/or strengthening materials; sheets may be made by pouring the sirup on a corrugated or flat surface before or after a fabric, metal or glass layer is placed on the surface; and the sirup may be used as a laminating layer for wood, plastic, and other surfaces. Subsequent to the aforesaid operations in matched metal molds, or by contact process, the sirup is polymerized under some pressure, e.g. 0.1 to 2000 p.s.i. and temperatures between room temperature and 150° C., to substantially 100% polymer or by any other suitable molding process. For optimum properties, the products should be cured under elevated temperatures up to 125° C. and pressures up to 1000 p.s.i. until the monomer content of the sirup has been reduced to a low level (preferably less than 1%). Where low pressures are used, it is sometimes necessary to eliminate dissolved gases by evacuation of the sirup prior to use.

The methacrylate sirups of the invention, due to their remarkable stability, are capable of being shipped from the point of manufacture to the fabricator without undesirable polymerization of monomer content. The fabricator is able to store the sirup without danger of polymerization until he wishes to use it. The sirup can then be combined with the fibers, fillers, etc. as described, molded, laminated or otherwise treated, without excessive exothermicity, to polymerize the monomer content to superior products.

We claim:

1. In a process for the preparation of polymerization-stable, methyl methacrylate-containing sirups, the steps which comprise heating, under reflux, methyl methacrylate in the presence of a chain transfer agent and a sufficient polymerization initiator to give less than 20 p.p.m. initiator after polymerization as determined by the formula $$X=10^{-3} \cdot 2^{Pt/H}$$

in which X is the weight percent of initiator added prior to polymerization, H is the half-life of the initiator and Pt is the polymerization time, until the resulting solution has a viscosity at 25° C. of between 0.5 and 50 poises and a polymer content of at least 20% by weight, and quenching the solution by the addition of a solution at a temperature between 0 and 30° C. of a polymerization inhibitor dissolved in monomeric ester of the acid polymerized.

2. The process of claim 1 in which a cross-linking agent is added to the sirup obtained after it has been quenched.

3. In a process for the preparation of polymerization-stable, methyl methacrylate sirups, the steps which comprise preparing a solution containing methyl methacrylate, a chain transfer agent and an amount of a polymerization initiator sufficient to initiate polymerization of the methyl methacrylate but insufficient to leave more than 20 p.p.m. of initiator after polymerization as determined by the formula $$X=10^{-3} \cdot 2^{Pt/H}$$

in which X is the weight percent of initiator added prior to polymerization, H is the half-life of the initiator and Pt is the polymerization time, heating the resulting solution to polymerization temperature between 50 and 150° C., and when the viscosity of the solution is such that when cooled to 25° C., it will be between 2 and 15 poises and a polymer content of at least 20% by weight, quenching the solution by the adding of a solution at a temperature between 0 and 30° C. of a polymerization inhibitor dissolved in monomeric ester of the acid polymerized.

4. In a process for the preparation of polymerization-stable, methyl methacrylate sirups, the steps which comprise preparing a solution containing methyl methacrylate, a chain transfer agent and an amount of a polymerization initiator sufficient to initiate polymerization of the methyl methacrylate but insufficient to leave more than 20 p.p.m. of initiator after polymerization as determined by the formula $$X=10^{-3} \cdot 2^{Pt/H}$$

in which X is the weight percent of initiator added prior to polymerization, H is the half-life of the initiator and Pt is the polymerization time, heating the resulting solution to polymerization temperature between 50° C. and 150° C., and when the viscosity of the solution is such that when cooled to 25° C., it will be between 2 and 15 poises and a polymer content of at least 20% by weight, quenching the solution by the adding of a solution at a temperature between 0 and 30°% of hydroquinone in methyl methacrylate.

5. The polymer-in-monomer sirup prepared by the process of claim 1.

References Cited
UNITED STATES PATENTS

| | | | |
|---|---|---|---|
| 2,116,318 | 5/1938 | Miles | 260—89.5 |
| 2,120,006 | 6/1938 | Strain | 260—89.5 |
| 2,482,825 | 9/1949 | Amos et al. | 260—886 |

JOSEPH L. SCHOFER, *Primary Examiner.*

H. WONG, *Assistant Examiner.*